Patented May 2, 1950

2,506,345

UNITED STATES PATENT OFFICE 2,506,345

METHOD OF SEPARATING LIVE VIRUSES FROM NONVIRAL PROTEIN MATTER

Herald R. Cox, Suffern, and Stewart Aiston, Pearl River, N. Y., assignors to American Cyanamid Company, New York, N. Y., a corporation of Maine No Drawing. Application October 1, 1946, Serial No. 700,372

6 Claims. (Cl. 167—78)

This invention relates to improvements in the art of preparing vaccines and antigens and in particular to a new process by which viruses may be separated from associated protein matter to such extent that the purified virus can be used in a vaccine suitable for injection into human beings.

Numerous investigators have shown that the administration of active or inactive virus produces an increase in the titer of the circulating antibodies specific against the disease and that the average antibody response of human beings is directly related, though not directly proportional, to the amount of virus administered. The commercial production of such vaccines depends upon the ability to successfully produce large amounts of the virus in a form sufficiently free from foreign proteins to be injected into human beings without inducing untoward reactions.

Viruses are unique in that they must be propagated in the presence of living tissue. One of the most common methods of propagation is in incubated fertile eggs from which the virus is extracted from the chorioallantoic membrane, or fluid, the yolk sac membrane or the embryo itself, as the case may be. Inasmuch as many individuals are sensitive to egg protein, and others become sensitized upon injection of vaccines containing egg protein, it is necessary that methods be devised by which the sensitizing protein can be separated from the virus without serious loss of virus or decrease in its antigenic properties. Viruses have also been propagated in animals and the brain, spleen, liver and other organs, or the blood itself, have been removed and vaccines prepared therefrom. In such cases it is also desirable to remove non-viral protein matter to avoid the sensitization of persons receiving the vaccine.

Various methods have been devised to concentrate viruses and to eliminate foreign proteins so as to secure a safer and more potent preparation to be used as an immunizing vaccine. One such method involves repeated freezing and thawing of infectious allantoic fluid from which the bulk of the active virus then precipitates. The virus has also been adsorbed on various adsorbents, including red blood cells, calcium phosphate, aluminum, zinc and magnesium hydroxides, and the like. The precipitated virus is then recovered by elution or otherwise from the adsorbent.

One of the most successful methods has involved the use of high speed centrifuges, it being claimed that infectious allantoic fluid which shows a protein content of less than 10% of virus protein and over 90% of low molecular weight host proteins can be purified to a product in which the non-virus protein matter is less than about 5% of the total.

Although some of these methods have been in commercial use in the purification of virus vaccines, they are subject to numerous disadvantages, the most serious being the difficulty involved in preparing products substantially free of non-viral proteins. Another serious disadvantage is the fact that the recovery of virus is relatively low. The centrifuge method, although probably the best available, has the additional disadvantages in that because of the high speeds and low output of the machines, they are quite subject to mechanical breakdowns and yield a relatively low volume of the vaccine.

In attempting to find better methods of separating influenza virus from the non-viral protein matter associated therewith when the virus is propagated in eggs, we have discovered that the virus can be precipitated from aqueous suspension under conditions such that the virus is separated from much of the associated extraneous protein matter and is at the same time concentrated many times. Further purification of the virus precipitate by other processing steps as will be described herein, have made it possible to prepare a vaccine without any substantial loss of virus and which is freer from extraneous proteins of non-viral type than any of the other methods known at the present time.

In order that the nature of the invention will be more apparent certain procedures will be described. In this work the PR8, the Weiss, and the Lee strains of influenza virus were used. These viruses were propagated in fertile eggs, the eggs being inoculated through a small opening in the shell above the air sac into the allantoic sac of eleven day old white Leghorn chick embryos. The infected embryos were re-incubated at 96° F. for 42 to 48 hours, then held at room temperature for six to eight hours, followed by chilling at 4° C. for an additional 6 to 8 hours, after which the allantoic fluid was harvested aseptically and used as starting material.

To 100 ml. portions of Weiss allantoic fluid, cooled to 1° C., was added 95% ethanol (chilled to −40° C.) drop by drop until alcohol concentrations of 15, 20, 25 and 30 percent were obtained for the various portions respectively. The temperature of the allantoic fluid-alcohol mixture was gradually lowered as the concentration of alcohol was increased so that the temperature of the mixture was held at −5° C. during the later stages of alcohol addition. The mixture was allowed to stand at −5° C. for approximately 3 hours and then was centrifuged at 3500 R. P. M. for 30 minutes in an international size 1 centrifuge equipped with an angle head rotor. This centrifugation was carried out at −5° C. The supernatant was discarded. The precipitate was resuspended in 10 ml. of 0.1 molar phosphate buffer of pH 7.0 and allowed to stand at room temperature for 1 hour. The suspension was centrifuged a second time at 2,000 R. P. M. for 15 minutes in the same type of centrifuge except that this time the centrifugation was done at room temperature.

The supernatant fluid, which could be easily decanted from the insoluble protein sediment, was tested to determine the amount of virus present in terms of CCA activity. The results shown in Table 1 indicate that a yield of 92 per cent of virus was achieved by using a final alcohol concentration of 25 percent, while alcohol concentrations of 20 and 30 percent gave yields of 51 and 58 percent, respectively.

*Table 1*

|  | Percent concentration of ethyl alcohol | CCA titer | Percent Yield |
|---|---|---|---|
| Weiss allantoic fluid—starting material |  | 67 |  |
| Weiss allantoic fluid, 2x concentrated | 15 | 28 | 21 |
| Do | 20 | 69 | 51 |
| Do | 25 | 123 | 92 |
| Do | 30 | 78 | 58 |

By similar procedures it was determined that an 85 to 95 percent recovery of Lee virus was obtained by a final concentration of 35 percent ethanol.

Table 2 shows the results obtained when methanol was added to Lee allantoic fluid under conditions similar to those described above.

*Table 2*

|  | Percent concentration of methanol | CCA titer | Percent Yield |
|---|---|---|---|
| Lee allantoic fluid—starting material |  | 141 |  |
| Lee allantoic fluid—10x concentrated | 15 | 1,020 | 72 |
| Do | 20 | 1,350 | 96 |
| Do | 25 | 1,410 | 100 |
| Do | 30 | 1,380 | 90 |

It is seen that a 100 percent yield of virus was obtained by using 25 percent methanol and that recoveries of 98 and 96 percent were obtained by using methanol concentrations of 30 and 20 percent, respectively. Furthermore, it is apparent that the optimal concentration of methanol is not as critical as that of ethanol and that excellent yields of virus may be obtained over a fairly broad range of methanol concentrations.

In similar procedures carried out with the Weiss infected allantoic fluid it was found that an approximate 100 percent yield could be obtained with 25 percent methanol concentration, whereas precipitation of PR8 infected allantoic fluids indicate that a slightly less quantity of methanol may be preferred since the optimal recoveries with this strain were achieved with approximately 21 percent methanol.

The various concentrates obtained from the allantoic fluid by alcohol precipitation as described above, while greatly reduced in non-viral protein content, still contained more chick protein than desired. While this residual chick protein may be removed by repeated precipitations with alcohol, we have found it advantageous to remove further amounts at this stage of the process by centrifugation. The following procedure is illustrative.

To 1500 ml. of infected allantoic fluid, containing no preservative, were added 500 ml. of absolute methyl alcohol as described above. The mixture was held at −5° C. for 3 hours and then centrifuged at 3500 R. P. M. for 30 minutes, the centrifugation procedure taking place in a −5° C. chillroom. The supernatant was discarded. The precipitate was resuspended in 200 ml. of 0.1 molar phosphate buffer of pH 7.0. After holding for 1 hour at room temperature, the insoluble protein material was removed by centrifuging at 2,000 R. P. M. for 15 minutes at room temperature. The supernatant thus was concentrated 7½ times in terms of the original starting material. The supernatant was then batch-bowled in a Sharples laboratory centrifuge for 30 minutes at 50,000 R. P. M. and then 1 liter of 0.1 molar phosphate buffer of pH 7.0 was run through the bowl at the rate of 1 liter per hour, maintaining the speed at 50,000 R. P. M. The contents of the bowl were then shaken to resuspend the virus in the phosphate buffer and the final volume was brought to 300 ml. thus effecting a five fold concentration in terms of the original allantoic fluid.

Table 3 shows the results obtained with a sample of Lee strain, allantoic fluid processed as described above.

*Table 3*

|  | CCA titer | Total N in mgs. per ml | CCA units per mg. N | Per Cent Yield |
|---|---|---|---|---|
| Lee allantoic fluid | 102 | 0.80 | 127 |  |
| Lee allantoic fluid, Alc. ppt., conc. 7 1/2x | 735 | 0.236 | 3,115 | 97 |
| Lee allantoic fluid, Alc. ppt., centrifuged 5x conc | 485 | 0.033 | 14,700 | 95 |

In the following table are shown the results obtained by the identical procedure with the Weiss strain.

*Table 4*

|  | CCA titer | Total N in mgs. per ml | CCA units per mg. N | Per Cent Yield |
|---|---|---|---|---|
| Weiss allantoic fluid | 177 | 0.96 | 184 |  |
| Weiss allantoic fluid, alc. ppt., 7 1/2x conc | 1,324 | 0.336 | 3,940 | 99 |
| Weiss allantoic fluid, alc. ppt., centrifuged 5x conc | 815 | 0.048 | 16,980 | 92 |
| Weiss allantoic fluid, alc. ppt., centrifuged and reprecipitated with alcohol conc. 5x | 662 | 0.027 | 24,520 | 76 |

The relative infectivity of the methanol precipitated virus was determined and found to be unimpaired even after three successive precipitations. The final product possessed an infectivity endpoint of $10^{-8.50}$ while the control material titrated $10^{-8.75}$.

Obviously, various modifications may be made in the procedure just described. Acetone and other known protein precipitants may be used in place of alcohol. Repeated precipitations can also be conducted under different conditions of temperature, alcohol concentration, pH and ionic strength whereby a vaccine substantially free of non-viral protein matter can be obtained. These precipitations may be conducted within the ranges of pH 5.0 to 8.0, temperature from the freezing point of the solution to about +5° C., ionic strength from 0.005 to 0.5 and alcohol concentration from 15% to about 40% by volume. As these variant factors are dependent upon each other to some extent, optimum conditions for maximum purification are determined by simple experimentation within the range. Under ordinary conditions the aqueous suspension of virus as prepared from the living tissue will not need any particular adjustment of pH or ionic strength inasmuch as it will have these values within the desired range. When the crude virus preparation contains much tissue it may be removed at any stage of the process by low-speed centrifugation or by other suitable methods. One such process involves suspending the virus material after initial alcohol precipitation at 1/20 its original volume at about pH 6.2 with 0.02 molar phosphate buffer solution. On centrifuging at relatively low speeds the tissue and much of the foreign protein stays in suspension while the virus is sedimented. This process makes it possible to effect a separation between viral and non-viral proteins. The sedimented virus following this procedure may be then resuspended in appropriate buffer solution such as 0.1 molar phosphate buffer of pH 7.0.

Although, as noted above, separation of non-viral proteins can be achieved by repeated precipitation with alcohol the most effective method appears to involve the combined use of alcoholic precipitation and centrifugation. By this combination of steps it is possible to separate protein fractions that cannot be conveniently separated by either alcoholic precipitation or centrifugation procedures alone. It appears that some of the non-viral protein matter possesses some of the same sedimentation characteristics as the viral protein and on centrifugation complete separation is difficult or impossible. The alcohol precipitation characteristics of the different kinds of protein matter differ sufficiently, however, to make it possible to separate them by this procedure—that is, by alcohol precipitation and fractionation methods.

Obviously the process described hereinabove is applicable to the preparation of both immunizing vaccines and diagnostic antigens. The exact details of the preparation of these products are matters well within the skill of the art. The particular vehicle in which it is to be dispersed and the titer of the final product are open to choice. Inactivation of the virus by formaldehyde or other means, if desired, is also a matter outside the scope of the present invention.

The procedure described herein for influenza virus may be applied to the production of purified vaccines and antigens of other viruses and Rickettsiae including those such as eastern and western equine encephalomyelitis, yellow fever, St. Louis encephalitis, Colorado tick fever, rabies, psittacosis, Rocky Mountain spotted fever, epidemic and murine typhus, scrub typhus, Q fever, Jap B encephalitis, poliomyelitis and Newcastle virus. Inasmuch as viruses and Rickettsiae possess many of the same fundamental characteristics and are often classified together, the term "virus" as used herein and in the claims is employed in a generic sense to include the above and other related viruses and Rickettsiae falling within the scope of the present invention.

We claim:

1. A method of separating live viruses from non-viral protein matter in association therewith without destruction or loss of infectivity of the virus which comprises the steps of slowly adding to a cold aqueous suspension containing live virus and non-viral protein matter and having a pH within the range 5.0 to 8.0 and an ionic strength of between 0.005 and 0.5 at such rate as to avoid denaturation of said virus from about 15% to 40% by volume of a lower aliphatic alcohol while maintaining the temperature of the suspension below 5° C. whereby direct precipitation of the virus is caused to take place by the action of said alcohol unaided by and free from coprecipitated adsorbing agents and thereafter separating the precipitated infective virus from the aqueous phase which retains in solution most of the non-viral protein matter.

2. A method of separating live viruses from non-viral protein matter in association therewith without destruction or loss of infectivity of the virus which comprises the steps of slowly adding to a cold aqueous suspension containing live virus and non-viral protein matter and having a pH within the range 5.0 to 8.0 and an ionic strength of between 0.005 and 0.5 at such rate as to avoid denaturation of said virus from about 15% to 40% by volume of methanol while maintaining the temperature of the suspension below 5° C. whereby direct precipitation of the virus is caused to take place by the action of said alcohol unaided by and free from co-precipitated adsorbing agents and thereafter separating the precipitated infective virus from the aqueous phase which retains in solution most of the non-viral protein matter.

3. A method of separating live viruses from non-viral protein matter in association therewith without destruction or loss of infectivity of the virus which comprises the steps of slowly adding to a cold aqueous suspension containing live virus and non-viral protein matter and having a pH within the range 5.0 to 8.0 and an ionic strength of between 0.005 and 0.5 at such rate as to avoid denaturation of said virus from about 15% to 40% by volume of ethanol while maintaining the temperature of the suspension below 5° C. whereby direct precipitation of the virus is caused to take place by the action of said alcohol unaided by and free from co-precipitated adsorbing agents and thereafter separating the precipitated infective virus from the aqueous phase free from inorganic salts and most of the non-viral protein matter originally associated therewith.

4. A method of separating live viruses from non-viral protein matter associated therewith in chorioallantoic fluid without destruction or loss of infectivity of the virus which comprises the steps of slowly adding to a cold aqueous suspension of chorioallantoic fluid containing live virus and non-viral protein matter and having a pH within the range 5.0 to 8.0 and an ionic strength of between 0.005 and 0.5 at such rate as to avoid denaturation of said virus from about 15% to 40% by volume of methanol while maintaining the temperature of the suspension below 5° C. whereby direct precipitation of the virus is caused to take place by the action of said alcohol unaided by and free from co-precipitated adsorbing agents and thereafter separating the precipitated infective virus from the aqueous phase which retains in solution most of the non-viral protein matter.

5. A method of preparing vaccines which comprises the steps of slowly adding to a cold aqueous suspension containing infective virus and non-viral protein matter and having a pH within the range 5.0 to 8.0 and an ionic strength between 0.005 and 0.5, 15% to 40% by volume of methanol at such rate as to avoid denaturation of said virus, while maintaining the temperature of the suspension below 5° C. whereby the virus is precipitated by the action of said methanol unaided by and free from co-precipitated adsorbing agents and without loss of infectivity, separating the precipitated virus from the aqueous phase, resuspending the precipitated virus in an aqueous solution, centrifuging the solution and recovering the aqueous supernatent liquid containing the infective virus substantially free from non-viral protein matter.

6. A method of preparing an influenza vaccine comprising the steps of slowly adding 15% to 40% by volume of methanol to a cold aqueous suspension of chorioallantoic fluid containing live influenza virus and having a pH between 5.0 and 8.0 and an ionic strength from about 0.005 to 0.5 at such rate as to avoid denaturation of said influenza virus and while maintaining the temperature of the suspension below 5° C. whereby the influenza virus is precipitated with undiminished virulence, centrifuging the alcoholic suspension to sediment the precipitated virus, separating the precipitated virus in the supernatant aqueous phase, resuspending the precipitated virus in an aqueous suspension at about pH 7.0, centrifuging the suspension and recovering the supernatant aqueous phase containing the live influenza virus, supercentrifuging the aqueous phase and recovering the sedimented live influenza virus substantially free of non-viral protein matter and thereafter resuspending the sedimented virus in aqueous solution.

HERALD R. COX.
STEWART AISTON.

REFERENCES CITED

The following references are of record in the file of this patent:

Letter of Aug. 8, 1947, from U. S. P. H. S. concerning the article by Topping (1 page).

"Practical Physiological Chemistry," by Hawk et al., 12th ed. Copyright 1947, The Blakiston Co., pages 157 and 158.

"U. S. Public Health Reports," article by Topping et al., pages 778 to 781, May 31, 1946.

"Comptes Rendus (Doklady) de l'Academie des Sciences de l'URSS," article by Tovarnizky et al., pages 194–195.

"Science," article by Taylor et al., pages 587 to 589, Dec. 31, 1943.

"Journal of the Franklin Institute," article by McKinstry, pages 310 to 316, volume 238, Oct. 1944.